Patented July 4, 1950

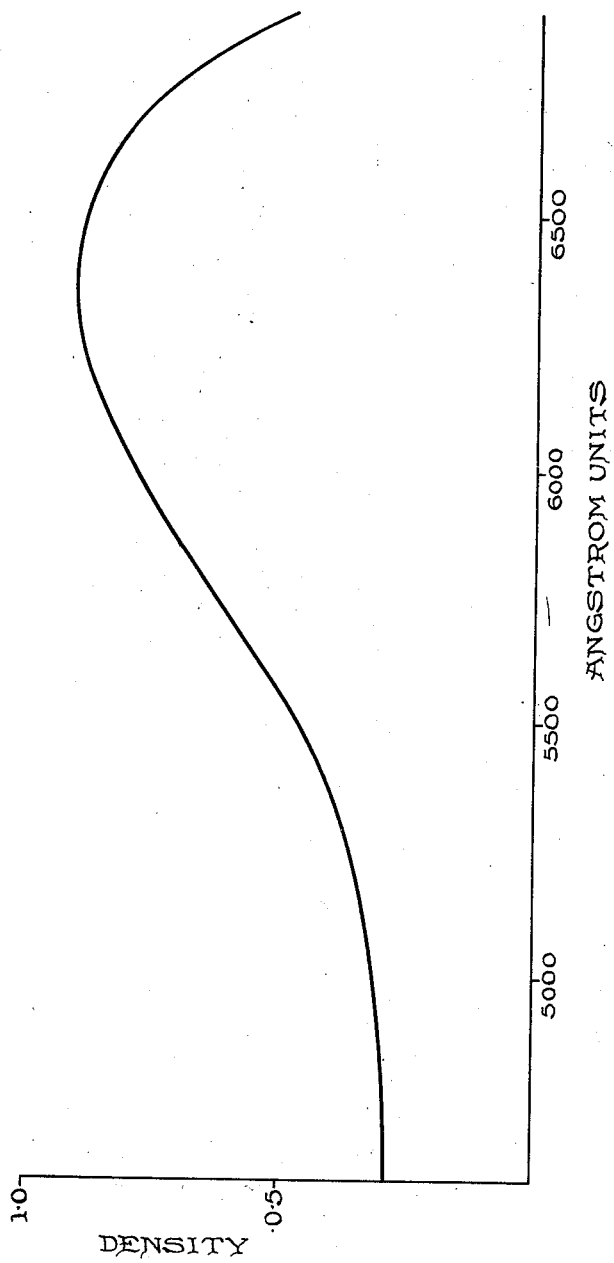

2,513,923

UNITED STATES PATENT OFFICE 2,513,923

DYESTUFFS FROM S-(THIAZOLYL-2)-THIO-GLYCOLLIC ACID AND METHOD FOR PREPARING SAME

George Frank Duffin and John David Kendall, Ilford, England, assignors to Ilford Limited, Ilford, England, a British company Application November 9, 1948, Serial No. 59,182
In Great Britain November 10, 1947

14 Claims. (Cl. 260—302)

This invention relates to the production of dyestuffs and pigments.

According to the present invention new and valuable dyestuffs and pigments are obtained by reacting together a monocarboxylic acid anhydride and a compound of the following general structure A:

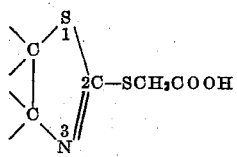

Such compounds may fall into three classes, viz.:

Formula 1

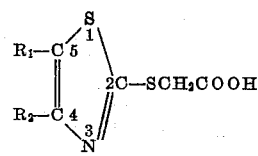

which are S-(thiazolyl-2) thioglycollic acids,

Formula 2

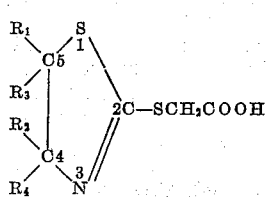

which are S-(thiazolinyl-2) thioglycollic acids, and

Formula 3

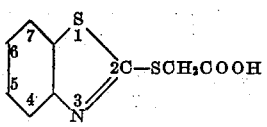

which are S-(benzthiazolyl-2) thioglycollic acids. This last class of compound may contain substituents on the benz ring, e. g. alkyl, aryl, aralkyl, alkoxy, amino and substituted amino groups or halogen atoms, or further fused benzene rings. These latter compounds may be, for example, naphthathiazole, anthrathiazole, phenanthrathiazole or anthraquinone-thiazole compounds.

The R groups in Formulae 1 and 2 may be hydrogen atoms or alkyl, aryl or aralkyl groups. Examples of suitable alkyl groups are methyl, ethyl, propyl, butyl and higher alkyl groups, aralkyl groups may be, for example, benzyl or naphthylmethyl, and aryl groups may be, for example, phenyl or naphthyl.

In general it is preferred that the 4-position in compounds of Formula 3 should be unsubstituted since it is found that whereas the reaction takes place very readily, e. g. in a few minutes, when the 4-position in such compounds is free, the presence of a 4-substituent frequently makes the reaction very slow indeed, taking, for example, 24 hours or more. Thus, although dyes are formed in a few minutes from S-benzthiazolyl-2-thioglycollic acid and the corresponding 6-ethoxy compound, the production of dyes from S-(4.5-benzbenzthiazolyl-2) thiogylcollic acid or S -(4 - methyl - 6 - chlor - benzthiazolyl - 2) thioglycollic acid takes several hours. Thus this last compound, heated with acetic anhydride for 24 hours gave a yield of only 25% of the dark blue dye, M. P. above 300° C.

Further, it should be noted that only the free thioglycollic acid is reactive, and the invention does not therefore include the use of derivatives such as the ester and amide.

The monocarboxylic acid anhydride employed may vary widely in constitution, but it is preferred to employ lower aliphatic anhydrides such as acetic anhydride, propionic anhydride and butyric anhydride and the immediately higher homologues. However, aromatic anhydrides may be employed, e. g. benzoic anhydride.

The formation of the dyestuffs as pigments is accelerated by warming the reagents together in a solvent medium, and the products separate from the solution in which they are sparingly soluble. In this connection it may be noted that the products of this invention are insoluble in water and in all the common organic solvents.

The presence of acids, and particularly strong acids, during the reaction tends to slow or even inhibit the dye formation. Thus a large excess of acetic acid slows the reaction and for this reason it is preferred to employ the minimum effective quantity of the monocarboxylic acid anhydride. Para-toluene sulphonic acid slows the reaction and causes the formation of an orange-yellow by-product, and sulphuric acid tends to inhibit the reaction entirely. On the other hand, the presence of a small quantity of an organic base, e. g. pyridine or triethylamine, tends to be beneficial.

The structure of the dyes and pigments obtained is believed, on the evidence available from analysis, to be represented by the following formulae which show the cis and trans modifications:

*Formula 4*

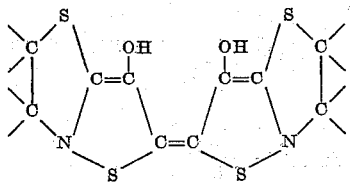

*Formula 5*

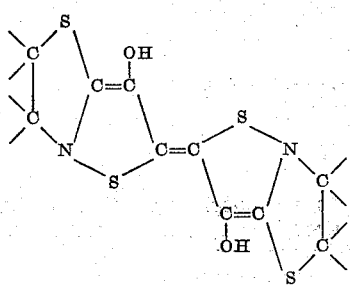

The hydroxy groups may be acylated in the products, due to the acylating action of the carboxylic acid anhydride, but these acyl groups are usually easily removed when the product is dissolved in alcoholic caustic soda or ammonia.

It will be seen from the foregoing formulae that the reaction takes place between two molecules of the thioglycollic acid and results in the removal of two molecules of water with a subsequent rearrangement of the molecular structure.

The products obtained from compounds of the Formulae 1, 2 and 3 correspond to the general Formulae 4 and 5 with appropriate variations in the thiazole ring systems. They resemble indigo and thioindigo in physical characteristics, for example in respect of their colours, their insolubility and their stability, but they are not susceptible to reduction to a leuco base as are the indigos.

The following examples serve to illustrate the invention, but are not to be regarded as limiting it in any way:

EXAMPLE 1

*Preparation of the dye from S-(benzthiazolyl-2)-thioglycollic acid*

Procedure A.—42 gm. of 2-mercapto benzthiazole were dissolved in 200 cc. of 10% sodium hydroxide solution and a solution of 25 gm. of monochloroacetic acid in 200 cc. of 10% sodium hydroxide solution was added to it. The solution was heated on the water bath for 2 hours and then filtered hot. The filtrate was acidified with 50 cc. of concentrated hydrochloric acid and the precipitated product filtered off and washed with water. 53 gm. of dry product were obtained which could be recrystallised from aqueous alcohol. M. P. 155° C.

2.1 gm. of S-(benzthiazolyl-2) thioglycollic acid, prepared as above, were dissolved in 10 cc. of commercial acetic anhydride and heated on the water-bath. The dyestuff began to separate almost immediately. The mixture was poured in 200 cc. of hot water and the precipitated dye filtered, washed with water and dried, giving a yield of 2.15 gm. of material. M. P. 280-2° C. This dye was extracted with acetone until the reddish colour first imparted to the acetone had disappeared. Weight of purified material was 1.8 gm. and M. P. 284° C.

This dyestuff gave an intense blue solution in methyl alcohol (1 part dye in 100,000 parts of methyl alcohol) containing some sodium hydroxide (30 parts). The absorption spectrum is shown in the accompanying drawing. This blue solution is unaffected by boiling. The dyestuff is also soluble in warm concentrated sulphuric acid to give a blue solution which is not decolourised on warming on a water-bath.

Procedure B.—S-(benzthiazolyl-2) thioglycollic acid (2 parts by weight) was heated with propionic anhydride (10 parts by volume) and pyridine (1 part by volume) for one hour at 100° C. The mixture was diluted with ethyl alcohol, the dye filtered off and extracted with acetone, finally yielding a dark blue powder (1.2 parts by weight, M. P. 280° C. approx.).

Procedure C.—S-(benzthiazolyl-2) thioglycollic acid (2 parts by weight) was heated with n-butyric anhydride (10 parts by volume) and pyridine (10 parts by volume) for one hour at 100° C. The mixture was diluted with ethyl alcohol, the dye filtered off and extracted with acetone, finally yielding a dark blue powder (M. P. 280° C. approx., 1.25 parts by weight).

Procedure D.—(S-benzthiazolyl-2) thioglycollic acid (2 parts by weight) was dissolved in pyridine (10 parts by volume), benzoic anhydride (5 parts by weight) added and the mixture heated for one hour at 100° C. It was then diluted with ethyl alcohol, the dye filtered off and extracted with acetone, yielding a dark blue powder (1.2 parts by weight, M. P. 280° C. approx.).

EXAMPLE 2

*Preparation of the dye from S-(6-ethoxybenzthiazolyl-2)-thioglycollic acid*

21.1 gm. of 2-mercapto-6-ethoxy-benzthiazole were dissolved in 40 cc. of 10% sodium hydroxide solution and 9.5 gm. of monochloroacetic acid in 40 cc. of 10% sodium hydroxide solution added to it. The solution was heated on the water-bath for 3 hours and then filtered hot. The filtrate was acidified with 10 cc. of concentrated hydrochloric acid and the product filtered off and dried. The yield was 25.5 gm. after drying. The material can be recrystallised from aqueous alcohol. M. P. 138° C. as small yellow-brown plates.

2.69 gm. of S-(6-ethoxybenzthiazolyl-2)-thioglycollic acid were dissolved in 20 cc. of commercial acetic anhydride and heated on the water-bath. A deep blue colour developed almost at once and the dye came out of solution in a few minutes. The mixture was poured into 200 cc. of hot water, cooled, filtered and the precipitated product washed with water. The yield of dried material was 2.85 gms. M. P. 300° C.

EXAMPLE 3

*Preparation of the dye from S-(6-aminobenzthiazolyl-2)-thioglycollic acid*

18.1 gms. of 6-amino-2-mercapto-benzthiazole dissolved in 100 cc. of 10% sodium hydroxide solution and 9.5 gm. of monochloroacetic acid in 40 cc. of 10% sodium hydroxide solution added to it. The solution was heated on the water-bath for 3 hours and then filtered. It was acidified with 10 cc. of concentrated hydrochloric acid and the product was precipitated, filtered and washed with water. The yield was 21 gm. of dry material, M. P. 175° C.

2.4 gm. of S-(6-amino-benzthiazolyl-2)-thioglycollic acid were dissolved in 10 cc. of acetic anhydride and heated on the water-bath. A reddish-blue colour developed in a very short time.

The mixture was poured into 200 cc. of hot water, cooled, filtered and the precipitated product washed with water. The yield of dye after drying was 2.0 gm. M. P. 297° C.

EXAMPLE 4

*Preparation of the dye from S-(5-bromobenzthiazolyl-2)thioglycollic acid*

2-mercapto-5-bromobenzthiazole (6.4 parts by weight) was dissolved in 10% aqueous sodium hydroxide (10 parts by volume), a solution of chloroacetic acid (2.35 parts by weight) dissolved in 10% aqueous sodium hydroxide (10 parts by volume) added and the solution heated for one hour at 100° C. It was filtered, neutralised with concentrated hydrochloric acid (2.5 parts by volume) and cooled. The product was filtered off and recrystallised from aqueous ethyl alcohol giving white needles, M. P. 144° C. (5.2 parts by weight).

S-(5-bromobenzthiazolyl-2)thioglycollic acid (4 parts by weight) was heated with acetic anhydride (20 parts by volume) and pyridine (2 parts by volume) for one hour at 100° C. The mixture was diluted with ethyl alcohol, the dye filtered off and extracted with acetone giving a dark blue powder with a bronze lustre, M. P. above 300° C. (3.2 parts by weight).

EXAMPLE 5

*Preparation of the dye from S-(5:6-dimethoxybenzthiazolyl-2)thioglycollic acid*

2-mercapto-5:6-dimethoxy benzthiazole (5.7 parts by weight) was dissolved in 10% aqueous sodium hydroxide (10 parts by volume) and ethyl alcohol (10 parts by volume), a solution of chloroacetic acid (2.4 parts by weight) dissolved in 10% aqueous sodium hydroxide (10 parts by volume) added to it and the mixture heated at 100° C. for two hours. The solution was filtered, neutralised with concentrated hydrochloric acid (2.5 parts by volume), cooled and the product filtered off. Recrystallising from aqueous ethyl alcohol yielded colourless needles, M. P. 167° C. (3.1 parts by weight).

S-(5:6-dimethoxy benzthiazolyl-2)thioglycollic acid (1 part by weight) was heated with acetic anhydride (5 parts by volume) for one hour at 100° C. The mixture was diluted with ethyl alcohol, filtered and the dye extracted with acetone, giving a deep blue powder with a bronze lustre (0.63 part by weight, M. P. above 300° C).

EXAMPLE 6

*Preparation of the dye from S-(5-methylbenzthiazolyl-2)thioglycollic acid*

2-mercapto-5-methyl-benzthiazole (4.5 parts by weight) was dissolved in 10% aqueous sodium hydroxide (10 parts by volume), a solution of chloroacetic acid (2.35 parts by weight) dissolved in 10% aqueous sodium hydroxide (10 parts by volume) added and the mixture heated at 100° C. for two hours. It was then filtered, neutralised with concentrated hydrochloric acid (2.5 parts by volume), cooled to crystallise, and filtered. The product was recrystallised from aqueous ethyl alcohol yielding colourless needles, M. P. 121° C. (4.05 parts by weight).

S-(5-methyl benzthiazolyl-2)thioglycollic acid (2 parts by weight) was heated with acetic anhydride (10 parts by volume) and pyridine (1 part by volume) for one hour at 100° C. The mixture was diluted with ethyl alcohol, filtered, and the dye extracted with acetone, finally giving a dark blue powder with a bronze lustre (1.97 parts by weight), M. P. 290° C. (approx.).

EXAMPLE 7

*Preparation of the dye from S-(6:7-benzbenzthiazolyl-2)thioglycollic acid*

2-mercapto-6:7-benzbenzthiazole (2.17 parts by weight) was dissolved in 10% aqueous sodium hydroxide (4 parts by volume), a solution of chloroacetic acid (0.95 part by weight) in 10% aqueous sodium hydroxide (4 parts by volume) added and the mixture heated at 100° C. for one hour. It was then cooled, neutralised with concentrated hydrochloric acid (1 part by volume) and filtered. The product was recrystallised from ethyl alcohol giving 0.95 part of colourless needles, M. P. 228° C.

S-(6:7-benzbenzthiazolyl-2)thioglycollic acid (0.4 part by weight) was heated with acetic anhydride (2 parts by volume) at 100° C. for one hour, then poured into excess ethyl alcohol, filtered and the dye extracted with acetone until no further colour was imparted to the acetone, giving a dark blue powder with a bronze lustre (0.24 part by weight, M. P. above 300° C.).

EXAMPLE 8

*Preparation of the dye from S-(4-methyl-thiazolyl-2)thioglycollic acid*

2-mercapto-4-methyl-thiazole (0.5 part by weight) was dissolved in 10% aqueous sodium hydroxide (1.53 parts by volume) and a solution of chloroacetic acid (0.36 part by weight) dissolved in 10% aqueous sodium hydroxide (1.53 parts by volume) added. The mixture was heated for one hour at 100° C., filtered and neutralised with concentrated hydrochloric acid (0.38 part by volume). The product precipitated as a white crystalline solid which was filtered off and dried, M. P. 116° C. (0.48 part by weight).

S - (4 - methyl - thiazolyl - 2)thioglycollic acid (0.315 part) was dissolved in a mixture of pyridine (2 parts by volume) and acetic anhydride (4 parts by volume) and the mixture heated at 100° C. for half an hour. It was then diluted with ethyl alcohol and the dye filtered off as a dark blue powder, M. P. 237° C. (0.30 part by weight).

EXAMPLE 9

*Preparation of the dye from S-(thiazolinyl-2)thioglycollic acid*

2-mercapto-thiazoline (5.95 parts by weight) was dissolved in 10% aqueous sodium hydroxide (20 parts by volume) and ethyl alcohol (20 parts by volume), a solution of chloroacetic acid (4.75 parts by weight) dissolved in 10% aqueous sodium hydroxide (20 parts by volume) added, and the mixture heated at 100° C. for 20 minutes. It was filtered while still warm, neutralised with concentrated hydrochloric acid (5 parts by volume) and cooled to crystallise. The product was filtered off and re-crystallised from water to give colourless needles, M. P. 120–5° C. (darkens at 115° C.), 3.28 parts by weight.

S-(thiazolinyl-2)thioglycollic acid (0.5 part by weight) was dissolved in a mixture of acetic anhydride (9 parts by volume) and pyridine (1 part by volume) at room temperature when an immediate reaction set in and after 2 minutes a red solid was precipitated. This was filtered off after diluting with ethyl alcohol, a brick red powder, M. P. 290° C. (0.4 part by weight).

What we claim is:
1. Process for the production of dyestuffs and pigments which comprises reacting together a monocarboxylic acid anhydride and a compound selected from the class consisting of an S-thiazolyl-2-thioglycollic acid, an S-thiazolinyl-2-thioglycollic acid, and an -S-benzthiazolyl-2-thioglycollic acid in which the 4-position of the benz ring is unsubstituted.

2. Process for the production of dyestuffs and pigments which comprises reacting together a monocarboxylic acid anhydride and an S-thiazolyl-2-thioglycollic acid.

3. Process for the production of dyestuffs and pigments which comprises reacting together a monocarboxylic acid anhydride and an S-thiazolinyl-2-thioglycollic acid.

4. Process for the production of dyestuffs and pigments which comprises reacting together a lower aliphatic monocarboxylic acid anhydride and an S-thiazolyl-2-thioglycollic acid.

5. Process for the production of dyestuffs and pigments which comprises reacting together a lower aliphatic monocarboxylic acid anhydride and an S-thiazolinyl-2-thioglycollic acid.

6. Process for the production of dyestuffs and pigments which comprises reacting together a lower aliphatic monocarboxylic anhydride and an S-benzthiazolyl-2-thioglycollic acid in which the 4-position of the benz ring is unsubstituted.

7. Process for the production of dyestuffs and pigments which comprises reacting together acetic acid anhydride and an S-thiazolyl-2-thioglycollic acid.

8. Process for the production of dyestuffs and pigments which comprises reacting together acetic acid anhydride and an S-thiazolinyl-2-thioglycollic acid.

9. Process for the production of dyestuffs and pigments which comprises reacting together acetic acid anhydride and an S-benzthiazolyl-2-thioglycollic acid in which the 4-position of the benz ring is unsubstituted.

10. Process for the production of dyestuffs and pigments which comprises reacting together a monocarboxylic acid anhydride and an S-thiazolyl-2-thioglycollic acid by heating these reagents together in the presence of a small quantity of an organic base.

11. Process for the production of dyestuffs and pigments which comprises reacting together a monocarboxylic acid anhydride and an S-thiazolinyl-2-thioglycollic acid by heating these reagents together in the presence of a small quantity of an organic base.

12. Process for the production of dyestuffs and pigments which comprises reacting together a monocarboxylic acid anhydride and an S-benzthiazolyl-2-thioglycollic acid in which the 4-position of the benz ring is unsubstituted, by heating these reagents together in the presence of a small quantity of an organic base.

13. The chemical compounds taken from the group consisting of compounds of the formula:

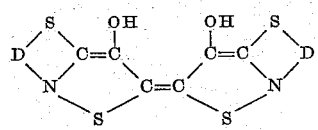

and of the formula:

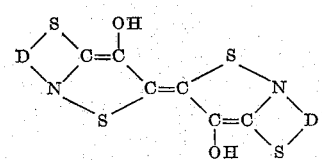

where D represents the atoms necessary to complete a ring system taken from the class consisting of thiazolyl, thiazolinyl and benzthiazolyl.

14. The chemical compounds taken from the group consisting of compounds of the formula:

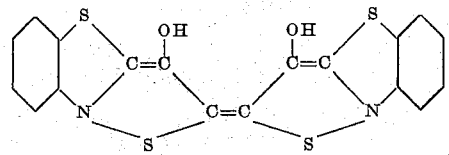

and the formula:

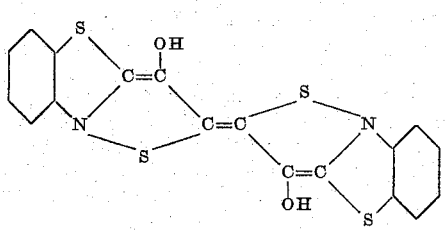

and corresponding acyl derivatives, where the benz ring is unsubstituted in the 4-position.

GEORGE FRANK DUFFIN.
JOHN DAVID KENDALL.

No references cited.